United States Patent [19]
Saitou et al.

[11] 3,791,408
[45] Feb. 12, 1974

[54] ELECTROMAGNETIC PRESSURE-TELECONTROLLING VALVE

[75] Inventors: Kouji Saitou, Yokosuka; Hisakazu Ichioka, Yokohama, both of Japan

[73] Assignee: Yuken Kogyo Company Limited, Kanagawa-ken, Japan

[22] Filed: May 31, 1972

[21] Appl. No.: 258,400

[52] U.S. Cl. .............................. 137/529, 251/129
[51] Int. Cl. ........................................... F16k 17/06
[58] Field of Search ..... 137/489.5, 492.5, 489, 529; 251/129, 130, 137

[56] References Cited
UNITED STATES PATENTS
3,701,366   10/1972   Tirelli ............................ 137/625.65
2,747,606   5/1956    Adams et al. ...................... 137/489
3,250,293   5/1966    Adams et al. ...................... 137/489
2,457,739   12/1948   Sherrill ........................... 251/137 X

*Primary Examiner*—Arnold Rosenthal
*Attorney, Agent, or Firm*—Steinberg & Blake

[57] ABSTRACT

This invention provides an electromagnetic pressure-telecontrolling valve characterized in that the valve inserted in a valve port is pressed by a pressure-controlling spring in the influence of a solenoid applied with a current, and that the hollow interior of said solenoid is filled with a damping oil so as to give a damping effect to an induced iron core.

6 Claims, 4 Drawing Figures

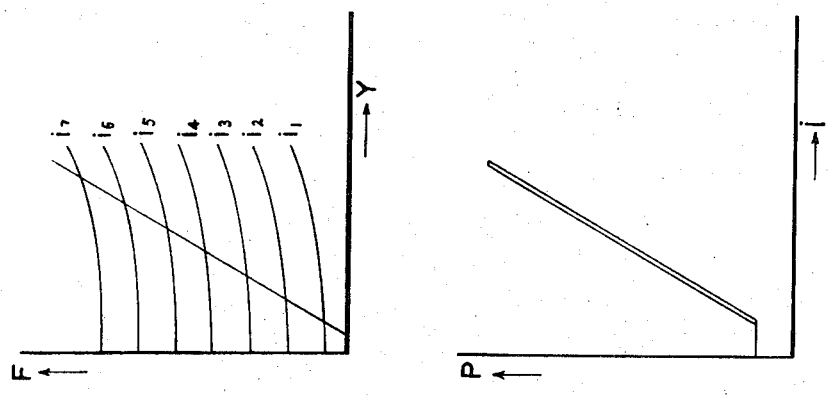
FIG. 2
FIG. 3
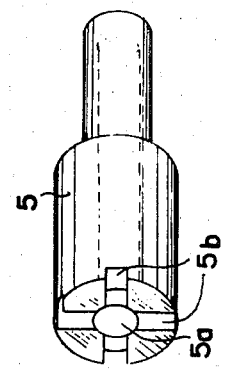
FIG. 4

ELECTROMAGNETIC PRESSURE-TELECONTROLLING VALVE

BACKGROUND OF THE INVENTION

A great number of pressure-controlling valves of various types had been already invented, developed and practically used, but the pressure-controlling springs, the most important elements of these valves, has very been often manually regulated and seldom or never regulated electrically, that is, by moving and positioning the valve rod by the force of magnetic excitation of a coil, so as to control the pressure of the valve. And besides, even the pressure-controlling valves of such a type using magnetic excitation of a coil has very often no function of damping the disturbances caused in the oil pressure circuit to accord a better performance to the valves.

SUMMARY OF THE INVENTION

This invention relates to a pressure-controlling valve improved by means of the conventional technique, more particularly a pressure-controlling valve wherein a pressure-controlling spring to regulate the pressure of the valve is actuated by a magnetic pull force excited by a DC solenoid (an electromagnet) to control the reaction of the spring acting on the valve body, the pressure control of said spring being regulated according to the regulating current supplied to the DC solenoid and the hollow interior of said solenoid being filled with an operating oil in order to give a damping or attenuating effect to a induced iron core placed in the interior of said solenoid, so as to telecontrol the pressure of the valve freely from a distant place as well as to prevent it from hunting at the natural frequency of valve.

The present invention aims at;
a. to provide a pressure-controlling valve wherein the pressure of the valve is electrically controllable through a pressure-controlling spring according to the force of a solenoid supplied with a current;
b. to provide a pressure-controlling valve having a high performance by filling the hollow interior of the solenoid with an operating oil so as to give a damping effect to an induced iron core and also to the pressure-controlling spring which can be compressed by the force of the solenoid, and to prevent the valve pressure from hunting or to prevent the valve from suffering a disturbance; and
c. to provide a pressure-controlling valve wherein the pressure-controlling spring is regulatable in its initial yield ability and wherein the pressure of valve is manually regulatable through said spring even in case of emergency such as power-off.

BRIEF DESCRIPTION OF THE DRAWINGS

The other objects and features of this invention as well as the above-described objects and features will be better understood in the following description of a preferred embodiment according to this invention, by way of example, with reference to the accompanying drawings, in which;

FIG. 2 shows a diagram explaining the relations between the input current of the solenoid in a part and the magnetic pull force of the solenoid and the reaction of the pressure-controlling spring in the other part;

FIG. 3 shows a diagram explaining the relation between the input current of the solenoid and the oil pressure (P); and FIG. 4 shows an oblique perspective of a spring bearing.

DESCRIPTION OF THE PREFERRED EMBODIMENT

Figure 1:
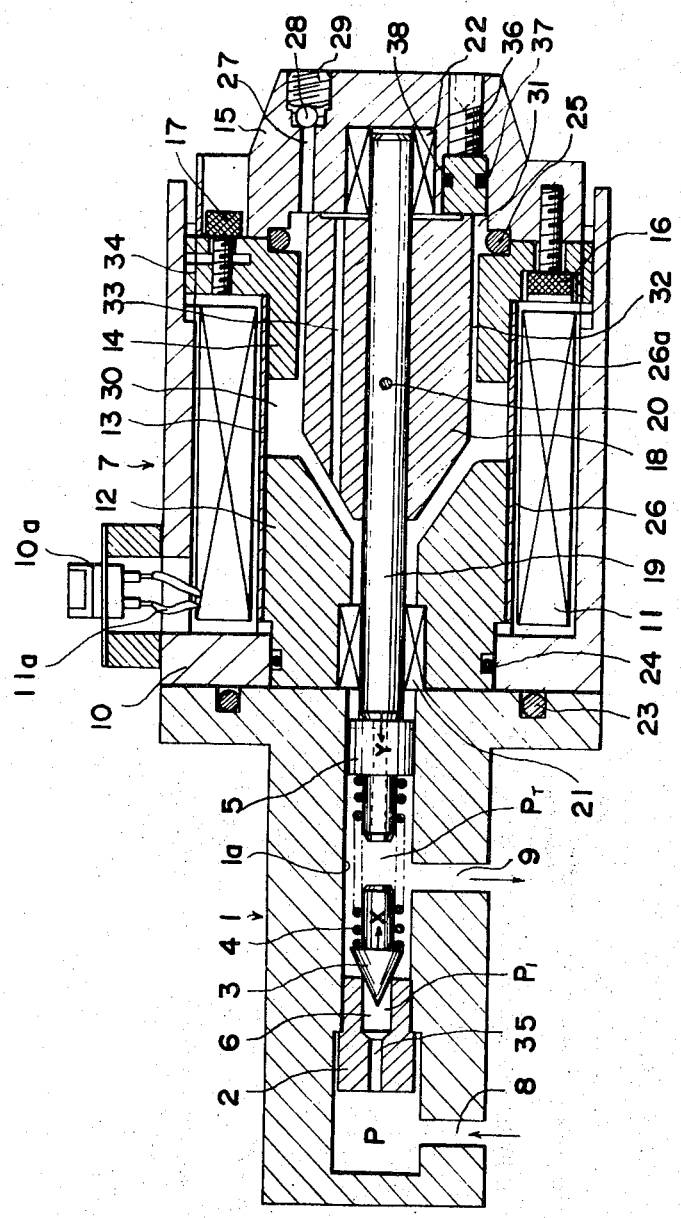
FIG. 1 shows a longitudinal section of a preferred embodiment according to this invention.

With reference to FIG. 1 showing a preferred embodiment according to this invention, a central longitudinal hole 1a is made, horizontally in the FIGURE, in the interior of a valve casing 1. A valve or valve body 3 can be received in a valve port 6 which is perforated in a valve seat 2 inserted in the central part of said hole 1a. The valve 3 can be pressed against the seat 2 through a pressure-controlling spring 4 by a spring bearing 5 mounted on a valve rod 19. The spring bearing 5 has a longitudinal penetrating hole 5a and diametric grooves 5b provided on the end face of said spring bearing 5. The valve casing 1 has an inlet 8 to introduce a pressure oil into the hollow interior of said valve casing from main valves, such as pressure-reducing valve, which are not shown here in the FIGURE and an opening 9 to connect a tank.

A solenoid 7 is mounted on the valve casing 1. The solenoid case 10 is used also as a yoke of fixed iron cores 12 and 14, which are pressed in a bush 13 and glued on the inside wall of said bush in the pressed-in and glued parts 26 and 26a. The fixed iron cores 12 and 14 are fastened on a solenoid cover 15 with a mounting bolt 16 so that the fixed cores 12 and 14, the bush 13 and a solenoid cover 15 can constitute a fixed member of solenoid. And a valve rod 19 and an induced core 18 are fixed on each other with a pin 20 so as to be a movable member of solenoid.

Therefore, the initial yieldability of said spring 4 can be determined by the longitudinal movement of said rod 19. Precisely, the inside end face of said solenoid cover 15 is always in contact with the end face of said induced core or armature 18 by the reaction force of said spring 4 which acts on said core 18 through said spring bearing 5. As the solenoid cover 15 is screwed in and jointed with the solenoid case 10 in the stroke-regulating screw part 34, the rotation of the solenoid cover 15 permits it moving axially, that is, horizontally in the FIGURE, and consequently the induced core 18 adjacent to said solenoid cover 15 moving axially. Thus the initial yieldability of the spring 4 can be determined by the solenoid cover 15 through the rod 19 and the spring bearing 5. The solenoid cover 15 can be fixed in a determined position with a swivel-check bolt 17.

The fixed iron cores 12 and 14 are wound with a coil 11 on the periphery, and the lead cables 11a of said coil are connected to a connector 10a mounted on the solenoid case 10. The rod 19 is supported glidingly in slide bearings 21 and 22. O rings 23, 24 and 25 are fitted on the solenoid to prevent it from leaking the oil. The longitudinal hole of small diameter 33 pierced in the induced core 18 can be served as passage of the damping oil or operating oil (such as silicon oil or other liquids of high viscosity) filled in a front chamber 30 and a rear chamber 31 in the hollow interior of the solenoid 7, and give a damping effect to the induced core 18 by choosing an adequate diameter of said hole 33. The solenoid cover 15 has an air vent 27 to communicate the hollow interior of the solenoid with the exterior of said solenoid. The air vent 27 can be shut up by a steel ball 28 and a plug 29.

Furthermore, the solenoid cover 15 has also a manually regulatable bolt 36 screwed in it, which can engage against the end face of said induced core 18 through a push rod 37, on the periphery of which a O ring 38 is fitted.

The pressure-controlling valve according to this invention that has such a construction as described above has a following function.

The electrical regulation of the valve is effected as follows; when the coil 11 is energized, the fixed iron cores 12 and 14 and the induced iron core 18 are excited by the force of said coil, and exert a magnetic pull force on each other. As the induced core 18 is axially movable along with the rod 19, the induced core 18 moves axially toward the spring bearing 5 and consequently the front end of said rod 19 pushes said spring bearing 5 toward the spring 4 so as to compress said spring 4 and increase the pressure by which said spring pushes the valve 3. The increased amount of pressure is proportional to the exciting current of said coil 11, due to the equality in magnetic pull force between the induced core 18 and the fixed cores 12 and 14, so that the regulation of the current supplied in the coil 11 permits the pressure being regulated. As the current to be supplied in the coil 11 can be telecontrolled from a distant place, the pressure of the valve 3 is also freely telecontrollable. The free regulation of the current value to be applied to the coil 11 can be easily effected by means of a separate control curcuit by dial operation or automatic telecontrol operation. A manually operated pressure-controlling bolt 36 can be used in case of emergency such as power-off, wherein the pressure-controlling spring 4 can be regulated through the spring bearing 5 by the bolt 36 rotated so as to move the rod 19 in the axial direction. In the case, no twist can be caused in the spring 4, due to the linear movement of said rod 19.

The function of the solenoid 7 is shown in FIGS. 2 and 3. If a pressure oil P is introduced in the hollow interior of valve casing through the pressure oil inlet 8, the oil can have a pressure $P_1$ in the valve port 6 by force of a nozzle 35. The solenoid 7 can cause a magnetic force F having a longitudinal direction toward the valve body 3 and a proportional value to the input current $i$, as shown FIG. 2, so as to push the valve 3 toward the nozzle 35 through the pressure-controlling spring 4. The pressure oil $P_1$ in the valve port 6 also can push the valve 3 open and flow out into the air in the hole $1a$ so that the oil pressure $P_1$ can be considered as proportional to the force acting onto the valve 3 through the spring 4, that is to say that the force F acting on the valve 3 through the spring 4 can be regarded as equivalent to the reaction force $F_{rv}$ acting on the valve 3 through the pressure oil $P_1$.

Furthermore, the displacement value $x$ of the valve 3 varies according to the reaction value $F_{rv}$ of said valve 3, but it is $x << i y$ in the case, wherein $y$ is a yieldability value of the spring 4. Therefore, if the yieldability value $y$ is equal to the pull stroke value of the solenoid 7 in FIG. 2, the increase of the input current $i$ in the solenoid 7 permits increasing also the magnetic pull force F, which is equilibrated on the intersectional points with the characteristic curve of the spring 4. Therefore, the oil pressure $P_1$ increases gradually. Besides, P increases proportionally to $P_1$, as the introduced amount of pressure oil in the valve 3 can be considered as substantially constant. FIG. 3 shows the variation of the oil pressure P according to the input current in the solenoid 7.

The characteristics in case of the solenoid pressing the valve 3 through the spring 4 are as follows; the pressure-controlling valve according to this invention, different from the conventional ones, has a pressure-controlling spring 4 instered between the valve part to control the oil pressure and the electromagnetomotive system. If the valve body and the electromagnetomotive system are connected directly to each other, they become a system of vibration having a degree of freedom, wherein the mass of both valve part and the electromagnetomotive system is higher and their natural frequency of vibration is lower, so that their responsiveness to the disturbances is lower and consequently the pressure is unstable. There will be caused in such pressure-controlling valves such ripples and irregular variation of the supplied pressure, variation of the load capacity (quantity of flow) of the valve, changes in oil temperature, mixture of impurities in the oil, etc., in the oil pressure circuit that will inevitably give some effects of disturbance to the valve. The conventional pressure-controlling valves wherein the valve part is connected directly with the solenoid part could not avoid such disturbances, while the pressure-controlling valve according to this invention has a valve part connected through a spring with the electromagnetomotive system so that the mass of the pressure-controlling valve part is smaller and the natural frequency is higher, and thus the immediate responsiveness to the disturbances is improved and the pressure is extremely stable. In short, this spring can present a damping effect and thus attenuate any possible vibration caused in the valve part by disturbances.

Besides, if no spring is used and only a solenoid is actuated against the possible disturbances, the displacement of the valve part from the seat part is then controlled by micron unit and the electro-magnetomotive system is also microncontrolled in displacement because said system is connected directly to said valve part, so that the electromagnetic force which can be considered as constant to said displacement can be only function of the current applied to the coil to make the valve part lower in static stability and the pressure unstable. All these advantages and disadvantages depend upon whether or not a spring is inserted between the valve part and the electromagnetomotive system.

As was above-described, the pressure-controlling valve according to this invention, wherein the regulation of the spring 4 is effected only by linear movement of the rod 19, present such advantages that the pressure-controlling spring 4 is unlikely to be "twisted," that the valve is telecontrollable, that the setting of pressure can be easily effected for a short time only by setting a current value to be applied to the solenoid 7, that the control circuit, if it is all made in a plug-in way, is exchangeable immediately in any accident, that the valve can be manually controlled in case of emergency, and that the rough and micro-controls of pressure is possible.

Furthermore, this invention is also characterized by the fact that the movable part of solenoid, that is, the induced iron core 18 and the rod 19, is provided with a damping effect to avoid a hunting at the natural frequency whicn is determined by the mass of said movable part of solenoid and the flexibility of the spring 4, equivalent to the magnetic pull force F. More particularly, the oil pressed out from the valve port 6 into the central hole 1a has a little higher pressure $P_T$ than the atmospheric pressure, due to resistance of the tank connecting pipe, etc., so that the pressure oil $P_T$ fills the hollow interior of the solenoid 7 through the penetrating hole 5a of the spring bearing 5 and the grooves 5b on the end face of said spring bearing and through the clearance of the slide bearing 21. In this case, the air in the hollow interior of the solenoid 7 is removed away through the air vent 27 which can be shut up with the plug 28, when the interior of the solenoid 7 is filled with the oil.

Under this condition, the movement of the movable part of solenoid permits the oil filling the front and rear chambers 30 and 31 moving through the small clearance 32 between the periphery of the induced core 18 and the fixed cores 12 and 14, or through the hole of small diameter 33 pierced in said induced core 18 if necessary, and giving a damping effect to the movable part of solenoid according to the viscosity of the oil, that is, the movable part of the solenoid 7 can move in the general use condition of low frequency by choosing properly the size of the small clearance 32 in the periphery of the induced core 18 or the size of the hole 33 in the induced core 18, and avoid any possible hunting at the natural frequency of high value.

Thus it will be seen that with the present invention there is provided a fluid-flow controlling assembly in which a valve means has an electromagnet means operatively connected thereto. The valve means includes the stationary valve member 2 which has an interior 6 in constant communication with the source of fluid under pressure, this interior of the stationary valve member 2 being closed by the movable valve member 3 which is urged to its closed position by the force of the spring means 4. The spring means 4 acts not only on the valve member 3 but also on the armature means 18 of the electromagnet means by way of the element 5 which engages one end of the spring means 4 and the rod 19 which is connected with and forms and extension of the armature 18. Therefore, with this construction in accordance with the degree to which the electromagnet means is energized, the armature 18 will be urged to the left, as viewed in FIG. 1, thus regulating the force of the spring means 4 and in this way regulating the pressure which the fluid requires in order to displace the movable valve member 3 away from the stationary valve member 2 in order to provide for passage of the fluid. In this way the pressure of the fluid is regulated. In order to enhance the stability and precision of the operation the entire electromagnet means has its hollow interior filled with oil. In addition, an adjusting means is provided for adjusting the initial force of the spring means 4 so as to regulate the initial force required to displace the valve member 3 away from its closed position. This adjusting means includes the rotary cover 15 which is threaded to the electromagnet means 7 at the threaded connection 34. Thus, by turning the cover 15 which forms the adjusting means it is possible to determine the initial axial position of the armature 18 and thus the initial axial position of element 5, so that in this way the initial degree to which the spring means 4 is compressed can be regulated. Furthermore, the adjusting means includes the manually turnable element 36 which engages an end of the armature 18 so as to provide an additional control, and this additional part 36 of the adjusting means is particularly effective under emergency conditions where it is desired to provide an exceedingly quick manual regulation of the position of the armature 18.

We claim:

1. In an assembly for controlling the flow of a fluid, valve means and electromagnet means operatively connected therewith, said valve means including a stationary valve member having a hollow interior which communicates with a source of fluid under pressure and a movable valve member having a closed position seated against said stationary valve member for closing the hollow interior thereof to prevent flow of the fluid, spring means operatively connected with said movable valve member for urging the latter to its closed position, movable electromagnet means having an armature operatively connected with said spring means for increasing the force with which said spring means opposes movement of said movable valve member away from said closed position thereof when said electromagnet means is energized, so that the extent to which said spring means opposes movement of the movable valve member away from the closed position thereof can be regulated in accordance with the extent to which said electromagnet means is energized, said electromagnet means having a hollow interior filled with a damping fluid for enhancing the stability of the operation of said electromagnet means, and said electromagnet means carrying an adjusting means which engages said armature for determining the initial position of said armature and thus the initial yieldability of said spring means.

2. The combination of claim 1 and wherein said electromagnet means includes a movable core formed by said armature and a stationary core surrounding said movable core and defining with the latter a gap in which the damping fluid is located, said armature itself being formed with an axial bore passing therethrough and in which the damping fluid is also located.

3. The combination of claim 1 and wherein said electromagnet means includes an outer casing and a cover threaded into said casing and engaging said armature, said cover forming at least part of said adjusting means so that by axially positioning said covering with respect to said casing the initial axial position of said armature will be determined.

4. The combination of claim 3 and wherein said cover threadedly carries a manually turnable screw member which forms part of said adjusting means and which also engages said armature to determine the initial position of the latter.

5. The combination of claim 1 and wherein said spring means is in the form of a coil spring coiled around part of said movable valve member, a spring bearing member supporting an end of the coil spring distant from said movable valve member, and a rod engaging said spring bearing member and connected to said armature for movement therewith.

6. The combination of claim 5 and wherein said spring bearing member is formed with an axial bore passing therethrough and with at least one radial bore at an end of said spring bearing member which is engaged by said rod so that the fluid which flows through the stationary valve member can flow through the interior of said spring bearing member.

* * * * *